United States Patent [19]

Haller

[11] Patent Number: 5,337,118

[45] Date of Patent: Aug. 9, 1994

[54] PHOTOGRAPHIC COPYING APPARATUS AND PROCESS OF OPERATION

[75] Inventor: Heinrich Haller, Flurlingen, Switzerland

[73] Assignee: Gretag Imaging AG, Regensdorf, Switzerland

[21] Appl. No.: 979,001

[22] Filed: Nov. 19, 1992

[30] Foreign Application Priority Data

Nov. 20, 1991 [DE] Fed. Rep. of Germany ..... 91810903

[51] Int. Cl.$^5$ ...................... G03B 27/32; G03B 27/52
[52] U.S. Cl. ....................................... 355/27; 355/123
[58] Field of Search ............... 355/27, 32, 35, 38, 355/46, 123; 352/123, 156, 6, 7, 8

[56] References Cited

U.S. PATENT DOCUMENTS

| | | | |
|---|---|---|---|
| 4,269,370 | 5/1981 | Carter et al. | 242/56 A |
| 4,688,737 | 8/1987 | Kogane et al. | 242/67.1 |
| 4,697,918 | 10/1987 | Kogane | 355/27 |
| 4,919,354 | 4/1990 | Huber et al. | 242/67.3 |
| 5,157,439 | 10/1992 | Sakamoto et al. | 355/35 |

FOREIGN PATENT DOCUMENTS

| | | |
|---|---|---|
| 335844 | 4/1977 | Austria . |
| 3538082 | 4/1986 | Fed. Rep. of Germany . |
| 37377888 | 5/1989 | Fed. Rep. of Germany . |
| 3744002 | 6/1989 | Fed. Rep. of Germany . |

*Primary Examiner*—Monroe H. Hayes
*Attorney, Agent, or Firm*—Burns, Doane, Swecker & Mathis

[57] ABSTRACT

A photographic copying apparatus for the processing of lengths of copy masters adhesively bonded into long strips, in particular negative film strips that may be wound onto film spools, comprises an exposure station located along a transport path of the negative film strip, wherein the negative film strip is exposed master by master onto an unexposed photographic copy material, in particular unexposed photographic paper, passed along a paper path extending within the copy apparatus, preferably under the film transport path, through the exposure station. The copy apparatus is equipped with two supply spools located on the inlet side of the photographic copy apparatus from which the negative film strip may be wound off selectively, and with two winding spools located on the outlet side of the copy apparatus onto which the negative film strip may be selectively wound after each passage through the copy apparatus. One supply spool and one winding spool are always connected with the negative film strip being processed, while the others are in waiting positions. The configuration according to the invention of the photographic copy apparatus consists in particular of the storage and winding spool connected with the film strip being located in an approximate straight line extension of the film transport path and directly adjacent to it, while film spools in waiting positions are located in an approximate straight line extension of the film transport path behind the film spools in the working positions.

21 Claims, 9 Drawing Sheets

PHOTOGRAPHIC COPYING APPARATUS AND PROCESS OF OPERATION

BACKGROUND OF INVENTION

The invention concerns a photographic copying apparatus. It further concerns a process for the operation of such a photographic copying apparatus.

In professional photographic laboratories at the present time, photographic copies—paper images—, for example, of exposed and developed negatives, are produced largely by fully automatic photographic copying apparatuses, the so-called printers. The operating personnel, in the case of such devices, essentially performs monitoring functions, controls the exposure process and maintains a continuous working process to the extent possible. For this purpose, the operating personnel is concerned with the copy material—for example unexposed and exposed photographic paper—and in particular must make certain that sufficient master material—exposed and developed negative film—is always available for further processing, and that the already processed negative film is removed in time from the copy apparatus in order to avoid unnecessary downtimes of the photographic copy apparatus. In advanced photographic copy devices, the negative films to be processed further are spliced together into long strips of negative films and wound onto supply spools supplied on the inlet side to the copy apparatus.

A strip of negative film is threaded on the inlet side into the film transport path and transported automatically through the copy apparatus. Following its passing through the processing station, for example, the exposure station, in which the negative is exposed onto unexposed photographic paper, the strip of negative film is again wound onto a winding spool located on the outlet side of the copy apparatus. When the rear end of the negative film strip leaves the supply spool, the operating personnel must replace the empty supply spool with a full one. However, in the meantime, the rear end also passes through the processing station and is drawn out of the film transport path and wound onto the winding spool. The operating personnel must therefore take care that the winding spool, which now is full, is replaced by an empty one as soon as possible.

The downtime of the copy apparatus depends essentially only on the reaction and manipulation time of the operating personnel. The operating personnel must therefore be ready at the exact moment, or otherwise the copy apparatus will be at a standstill for an unnecessary length of time. At the present time the operating personnel usually operates several devices simultaneously, such that exact timing is necessary, which in turn requires a very high degree of attention on the part of the personnel; in particular, the fill level of the film spools on the inlet and the outlet sides must be monitored accurately. There is hardly any time left for the rest of the tasks, for example the change of paper cassettes. In particular, in the transition to photographic copy apparatuses with an hourly capacity of 15,000 or more images, these tasks often cannot be performed at all, as for example the replacement of the film spools on the inlet side may take longer than the passage of the remaining negative film strip through the copy apparatus.

To eliminate this problem, it is proposed in U.S. Pat. No. 4,919,354 (corresponding to DE-A-3 737 788) to provide two storage and two winding spools at the inlet and the outlet side of the copy apparatus, said spools to be set on stub arbors located in a mirror image plane relative to the film transport plane, above each other. On the inlet side, each of the two supply spools is provided with its own feed and threading device. Each of the feed and threading devices comprises a pair of rollers consisting of a counter pressure roller fixedly mounted on the apparatus and an advance roller. Between the counter pressure rollers a wedge shaped switch is provided. At the end of the switch opposing the counter pressure rollers, a pivoting rocker is located; it carries the advance rollers driven in opposing directions, one of which is always abutting in each terminal position of the rocker against the corresponding counter roller. While for example the negative film strip is being reeled off the lower supply spool, a second supply spool may be set upon the second axle. The front end of the negative film strip is inserted manually between the rocker and the corresponding counter pressure roller. By actuating the rocker, the corresponding advance roller is pivoted against the counter pressure roller and the front end of the film is clamped in. All of the negative film strip is reeled off the lower supply spool and wound onto the winding spool. Only then is the advance roller associated with the upper supply spool activated and the new negative film strip threaded into the film transport path. During the reeling off of the negative film strip from the upper supply spool another supply spool is set onto the lower stub arbor in analogous manner, and so on.

On the outlet side again, two winding spools are provided for the negative film strip; they may be set onto two stub arbors, in an approximate mirror image plane relative to the film transport plane. Each of the two winding spools, which must be special catch rollers, is provided with a pivoting catch arm for the front end of the negative film strip. These catch arms are of a special design and guide the front end of the film to the catch spool desired.

While the layout proposed of two supply spools on the inlet side and two winding spools on the outlet side makes it possible for the operating personnel to replace, at any given time during the reeling off of the negative film strip from the working supply spool and the winding of the negative film strip, the empty second spool with a new full supply spool and the second full winding spool with a new empty one, the copy apparatus proposed has certain essential disadvantages capable of improvement. On the inlet side for each supply spool separate threading and feed devices, each containing a counter pressure roller and an advance roller, and a switch, are required. A separate drive motor is provided for each advance roller. The rocker carrying the two advance rollers must be reset manually or manually operated setting elements must be provided, to actuate a pneumatic reversing device. On the outlet side, the copy apparatus configuration is also complex. A separate pivoting catch arm is required for each winding roller to hold the front end of the film. The pivoting of the catch arms again requires separate drive motors and control devices. The entire configuration of the copy apparatus on the inlet and outlet side is thus relatively complex and requires excessive attention by the operating personnel for additional manipulating steps. Beyond this, the personnel must always be careful so that in each instance the correct supply or winding spool is being replaced (i.e., once the upper spool and then the lower one, etc.). A very great disadvantage consists of the fact that only special spools designed as catch spools may be used. However, an essential disadvantage of this state of the art copy apparatus primarily consists in that the negative film strip being processed must always be first completely withdrawn from the film transport path before a new one may be threaded in.

SUMMARY OF INVENTION

It is therefore an object of the present invention to eliminate the aforementioned disadvantages of known photographic copy apparatuses. In particular, a photographic copy apparatus is to be created, which makes possible a largely automatic operation at high copy outputs and simultaneously relieves the operating personnel of additional monitoring tasks. The film spools should be universally usable and in particular there should be no need for special catch spools to act as the winding spools.

The photographic copy apparatus according to the invention for the processing of lengths of copy masters adhesively bonded into long strips, in particular strips of negative film that may be wound onto film spools, comprises an exposure station located along a transport path. The negative film strip is exposed master by master onto an unexposed photographic copy material, in particular unexposed photographic paper, which is passed along a paper path within the copy apparatus, preferably under the film transport path, through the exposure station. The copy apparatus is equipped with two supply spools located at the inlet side of the copy apparatus and from which the negative film strip may selectively reeled off, and with two winding spools on the outlet side of the copy apparatus, onto which the negative film strip may be wound selectively following its passage through the copy apparatus, whereby always one supply spool and one winding spool are connected with the negative film strip being processed, while the others are in a waiting position. The configuration of the photographic copy apparatus according to the invention consists primarily of supply and winding spools connected in their working position with the negative film strips being processed and located in an approximately straight line extension of the film transport path, directly adjacent to it, and of film spools which, in the waiting position, are located in an approximately straight line extension behind the film spools in their working position.

It is especially advantageous that the supply and winding spools may be moved into the working position, while simultaneously the supply and winding spools are moved into the waiting position. In this manner it is always clearly apparent to the operating personnel which of the film spools are in the working position.

Preferably, the two supply spools and the two winding spools are mounted on motor driven disks or the like provided on both the inlet and the outlet side of the copy apparatus, with the axles of rotation of said disks being approximately perpendicular to the film transport path. It is especially advantageous if the rotating disks are mounted approximately vertically and on the inlet and outlet side of the copy apparatus in a manner such that the rotating axles of the disks and the winding arbors for the film spools located equidistant from the rotating axles on both sides, are arranged in an approximately straight line extension of and within the plane defined by the film transport path. The rotating axles of the disks and the winding arbors of the film spools are therefore located in the same plane as the film transport path.

The film spools in their waiting position may be moved in an especially simple manner into the working position and vice versa, if the disks or the like carrying the film spools may be rotated by at least 180 around their axles of rotation. The disks are appropriately driven by a step motor and preferably in the clockwise direction.

Preferably, on the outlet side of the copy apparatus an automatic film feeder device is provided for the transfer of the front end of the film in the waiting position to a pair of film drawing-in rollers. In a particularly advantageous variant embodiment, the film feeder device comprises a pivoting arm and a film clamp provided at the front end of the pivoting arm, into which the front end of the film may be clamped in; these may be moved from a rest position into a transfer position, wherein the film is transferred to the film drawing-in roller pair.

It is advantageous to articulate the pivoting arm eccentrically onto a motor driven crank disk, located approximately under the film drawing-in roller pair and to guide the end of the pivoting arm opposite the film clamp in a slot guide.

In a particularly preferred embodiment of the photographic copy apparatus according to the invention, the lower counter pressure roller of the film drawing-in roller pair is divided, so that the pivoting arm with the film clamp may be moved between the divided rollers, with the clamping gap of the film clamp being guided approximately at the height of the film transport path. Upon the passing of the film drawing-in roller pair the film clamp is automatically released, following the transfer of the front end of the film to the film drawing-in roller pair.

It is especially advantageous if the rotation of the disk on the inlet side and the motion of the pivoting arm equipped with the film clamp for the front end of the film are coupled together so that the front end of the film may be transferred to the film drawing-in roller pair without the formation of loops. In this manner the scratching of the sensitive surface of the negative film strip is reliably prevented.

A clear advantage for the operating personnel is that means for the monitoring of the fill degree of the supply spool in the working position are provided, said means being connected with control devices for the driving means of the disk carrying the supply spools and the film feeder apparatus. In this manner, the change in position of the supply spools may be readily automatized.

In another very particularly preferred variant embodiment of the invention, an automatically operated film threading device is located on the outlet side of the copy apparatus, whereby the front end of the film may be guided from the film transport path to the winding core of the winding spool in the working position. The film threading device preferably comprises two spoon like motor driven pivoting arms, articulated above and under the film transport path at the outlet side of the copy apparatus and which in a pivoted together state surround the winding core of the winding spool in the working position, thereby forming a guide channel for the front end of the film, extending from the film transport path to the winding core.

It is especially advantageous to coordinate the automatic motion of the spoon like pivoting arms and the automatic rotation of the disk carrying the winding spools so that the pivoting arms may only be pivoted inward following the completion of the rotation of the disk.

The variant embodiment wherein the spoon like pivoting arms are mutually inter-changeable is also highly advantageous. The winding direction of the negative film on the winding core of the winding spool may thereby be selected very simply, in or against the clockwise direction. In this manner, it is possible to wind the negative film strip with the coated side to the outside or inside, as needed.

In order to prevent the rear end of the negative film strip from hanging down loosely or the loosening of the wound film on the winding spool, for each of the winding spools a film end holding device is provided; it is located on the disk on the outlet side and is in the form of spring loaded pivoting arms pivoting against the winding spool in operation. If it is detected that the rear end of the negative film strip leaves the film transport path in the copy apparatus, the corresponding film holding device is pivoted against the film spool involved. Preferably, the detector device for the film end provided for this purpose outside the film transport path is connected on the one hand with control means for the film end holding device, and on the other, with control means for the drives of the disk on the outlet side and the film threading device.

As a safety measure, the disk on the winding side preferably has a monitoring device, for example a light barrier, to ascertain the presence of a winding spool in the waiting position.

It is particularly advantageous that in the photographic copy apparatus according to the invention the empty supply spools may be used as winding spools.

In the process according to the invention for the processing of lengths of copy masters adhesively bonded together into long strips, in particular negative film strips, in a photographic copy apparatus, the negative film strip is reeled off optionally from one of the two supply spools located on the inlet side of the copy apparatus and transported by film transport means along a film transport path. In an exposure station the masters on the negative film strips are exposed onto photographic copy material, preferably onto unexposed photographic paper, extending along a paper path within the copy apparatus and preferably under the film transport path, and transported through the exposure station. After passing through the exposure station the negative film strip is selectively wound onto one of two winding spools located on the outlet side of the copy apparatus. For this, according to the invention, the supply spool in use and the winding spool selected are moved into a working position wherein they are located in an approximately straight line extension and in the immediate vicinity of the film transport path. The supply spool and winding spool in the waiting position, on the other hand, are located in an approximately straight line extension of the film transport path behind the film spools in the working position.

BRIEF DESCRIPTION OF THE DRAWINGS:

Further particularly preferred variant embodiments will become apparent from the following description relative to the exemplary embodiments shown in the figures, wherein the following are shown in partially schematic views.

Figure 1:
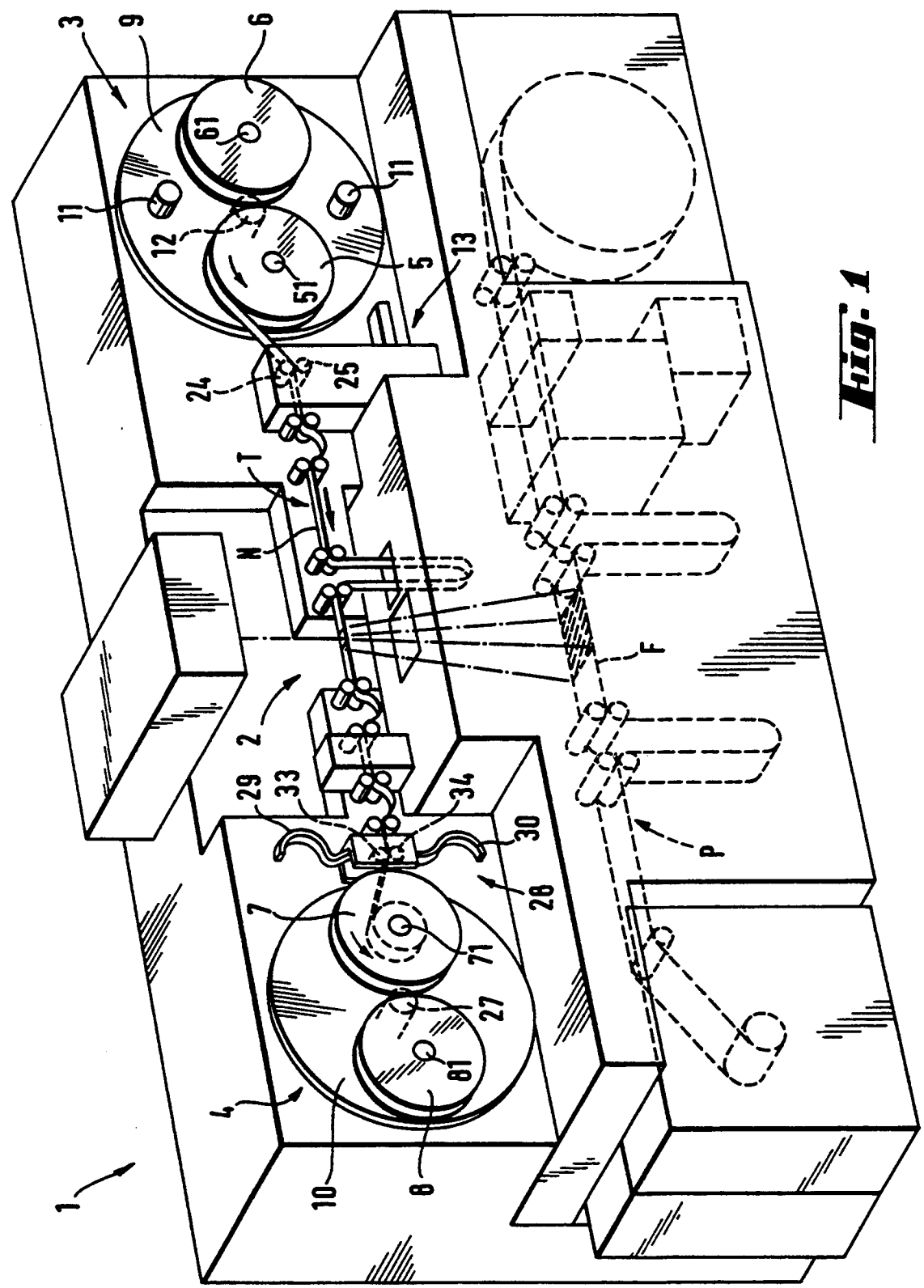
FIG. 1 shows an overview diagram of an exemplary embodiment of a photographic copy apparatus according to the invention.

DETAILED DESCRIPTION OF THE PREFERRED EMBODIMENTS:

A photographic copy apparatus according to the invention is generally designated 1 in FIG. 1. It concerns, in particular, a photographic copy apparatus for the processing of lengths of copy masters adhesively bonded into long strips, in particular, of negative film strips N that may be wound onto film spools. The copy apparatus 1 has, along a transport path T of the negative film strip N, an exposure station 2 wherein the negative film strip N is exposed master by master to unexposed photographic materials, in particular, unexposed photographic paper F. The unexposed photographic paper is passed along a paper path P extending within the copy apparatus, usually below the film transport path T, through the exposure station 2.

Practically all of the photographic copy apparatuses of more recent designs operate on this principle; such an apparatus is described for example in U.S. Pat. No. 4,919,354 and the equivalent DE-A-3 737 788. The description of the photographic copy apparatus according to the invention is therefore limited to the differences relative to the invention compared to this type of apparatus.

Figure 2:
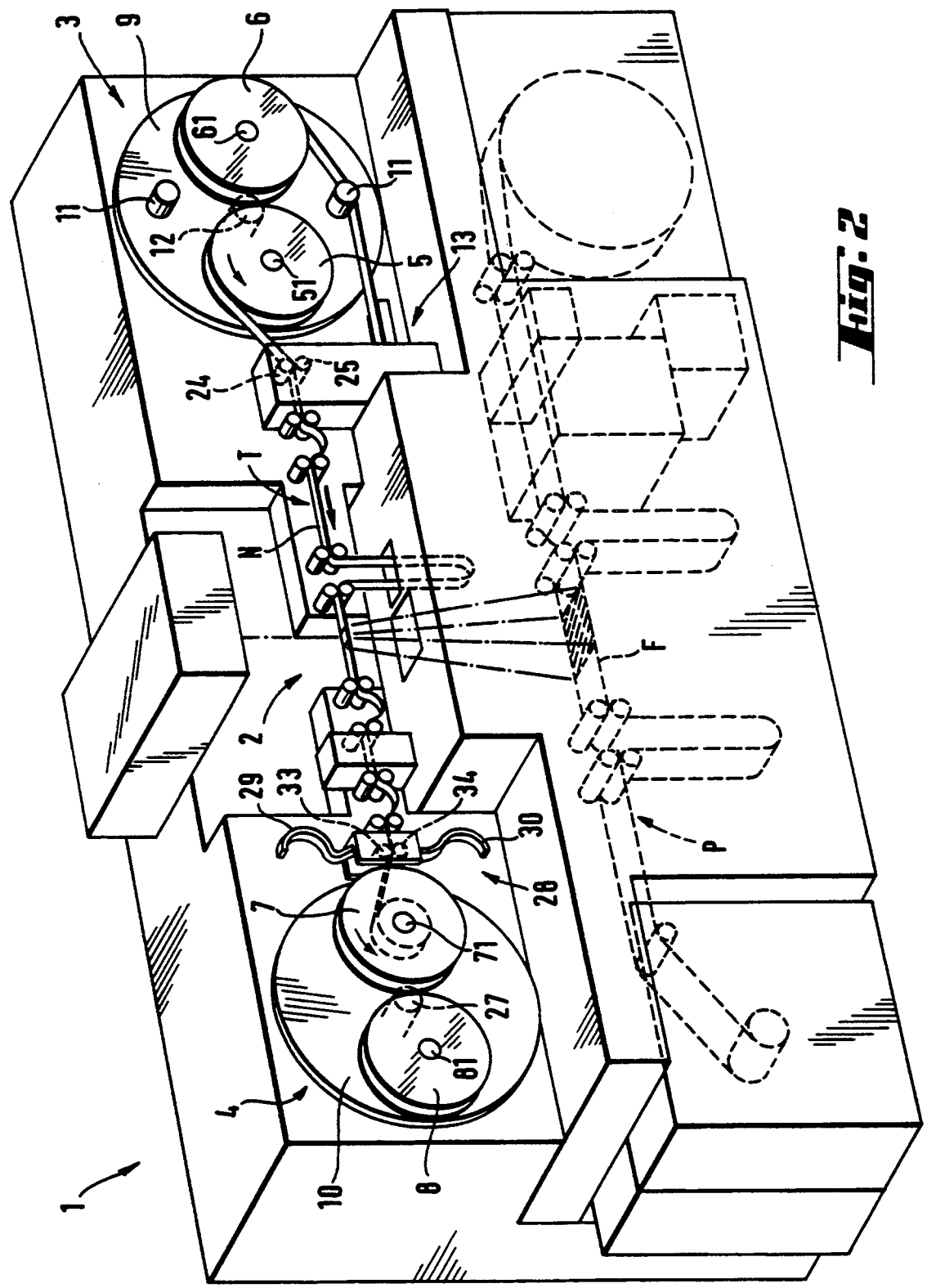
FIG. 2 shows a film transport path of the photographic copy apparatus with the supply spools on the inlet side and the winding spools on the outlet side.

According to the views in FIGS. 1 and 2, at the inlet 3 of the copy apparatus 1 two supply spools 5 and 6 are located, from which the negative film strip may be selectively reeled off. On the outlet side of the copy apparatus two winding spools 7 and 8 are shown, onto which the negative film strip N may be selectively wound after having passed through the exposure station 2. In the process, always one supply spool 5 and one winding spool 7 are in their working positions and are connected with the negative film strip N being processed, while the second film spools 6 and 8 are in a waiting position.

The configuration according to the invention of the photographic copy apparatus 1 in particular consists of supply and winding spools connected in their working position with the negative film strip N being processed and located in an approximately straight line extension of the film transport path T immediately adjacent to it, while the film spools 6 and 8 are located in their waiting position in an approximately straight line extension of the film transport path T, behind the film spools 5 and 7 in their working position.

It is especially advantageous to place the two supply spools 5 and 6 on the inlet side 3 and the two winding spools 7 and 8 on the outlet side 4 of the photographic copy apparatus 1 so that the film spools 5 and 7 may be moved, preferably automatically, from their working position into their waiting position, if the supply spool 5 is empty and the winding spool 7 full. In the process, the full supply spool 6 previously in the waiting position and the second, still empty winding spool 8 are moved simultaneously into their working positions. In this manner, it is not necessary for the operating personnel to determine which of the film spools is due for replacement, as it is assured that always the empty supply spool and the full winding spool are in their rear waiting position and are to be replaced by a new full supply spool and an empty winding spool.

According to the view in FIGS. 1 and 2, the two supply spools 5 and 6 and the two winding spools 7 and 8 are mounted on motor driven disks 9 and 10, located on the inlet side 3 and the outlet side 4 of the photographic copy apparatus 1. It should be understood that the configuration of the disk is merely an example. In place of the disk, a rotating polygon or a rotating arm could also be provided equipped with motor driven winding arbors for the film spools. The rotating axles of the disks 9 and 10 or similar means are perpendicular relative to the film transport path T.

The disks 9 and 10 could for example be mounted horizontally on the inlet and outlet sides of the copy apparatus. Preferably, however, they are mounted vertically, as shown in FIGS. 1 and 2. In particular, the rotating axles 12 and 27 of the disks 9 and 10 and the winding arbors 51, 61, 71, and 81, located at equal distances, from either side of the rotating axles 12 and 27, are placed in an approximate straight line extension within the horizontal plane defined by the film transport path T. In this manner it is not necessary to deflect the negative film strip in the horizontal direction and there is no unilateral stress that could lead to damage of the sensitive coating.

The rotation of the disks 9 and 10 around their rotating axles 12 and 27 preferably amounts to at least 180, in order to interchange the film spools in their working and waiting positions. However, complete rotatability over 360 is preferred; it is effected advantageously by means of a stepping drive. The disks 9 and 10 on the inlet and outlet sides are rotated as usual in the clockwise direction.

Figure 3:
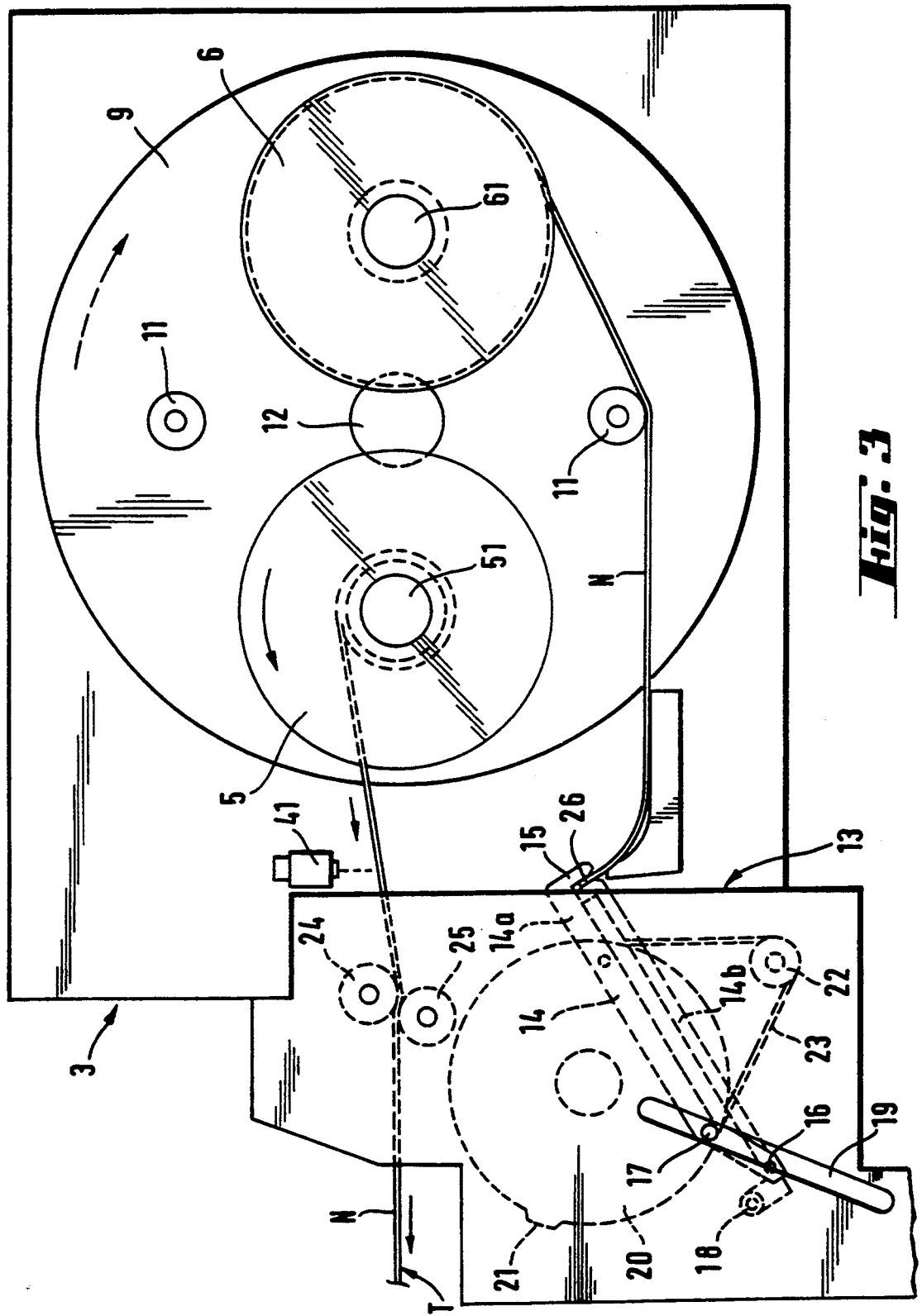
FIG. 3 shows a detailed view of the inlet side of the photographic copy apparatus.
Figure 4:
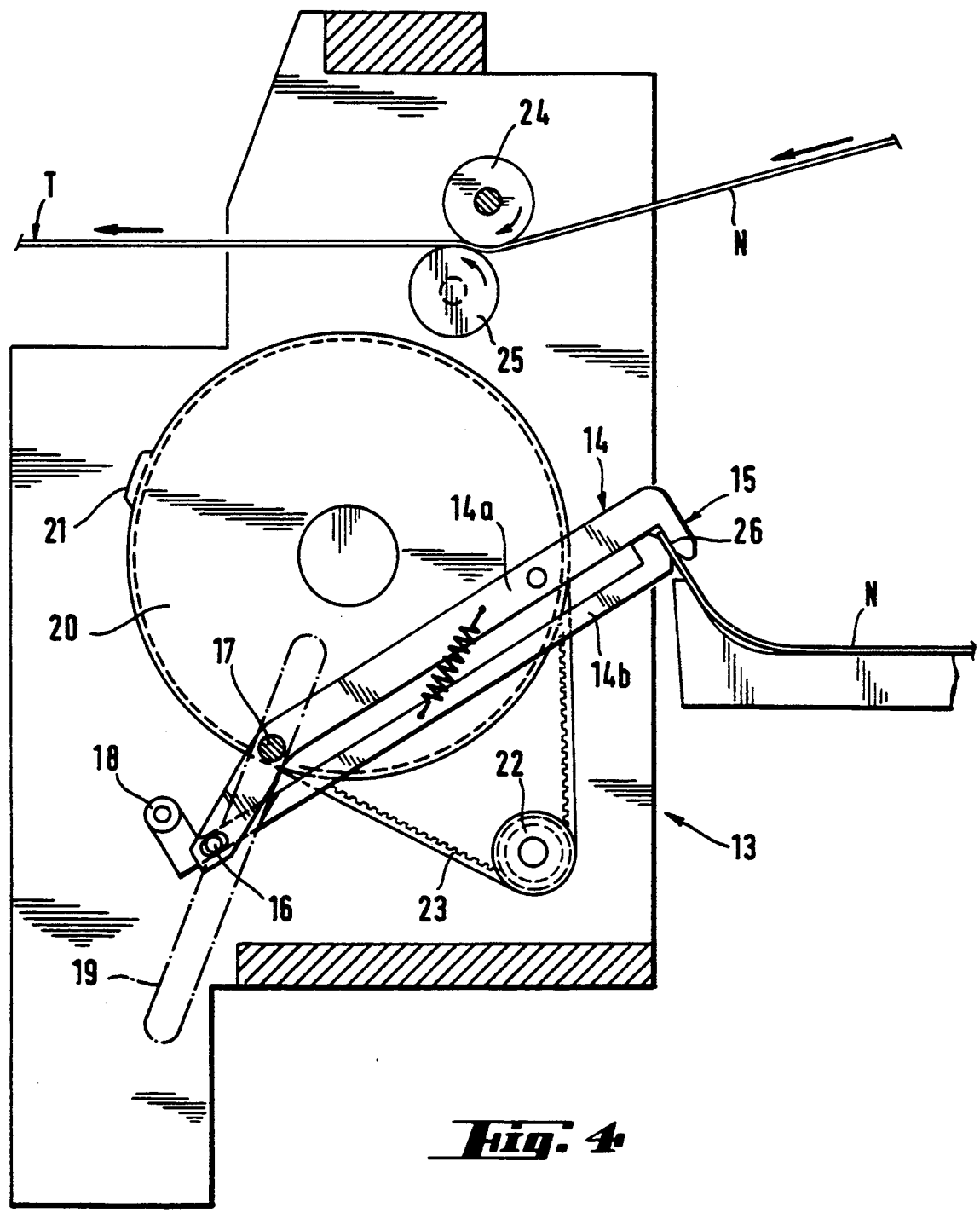
FIG. 4 shows a film feeder device in a waiting position.
Figure 5:
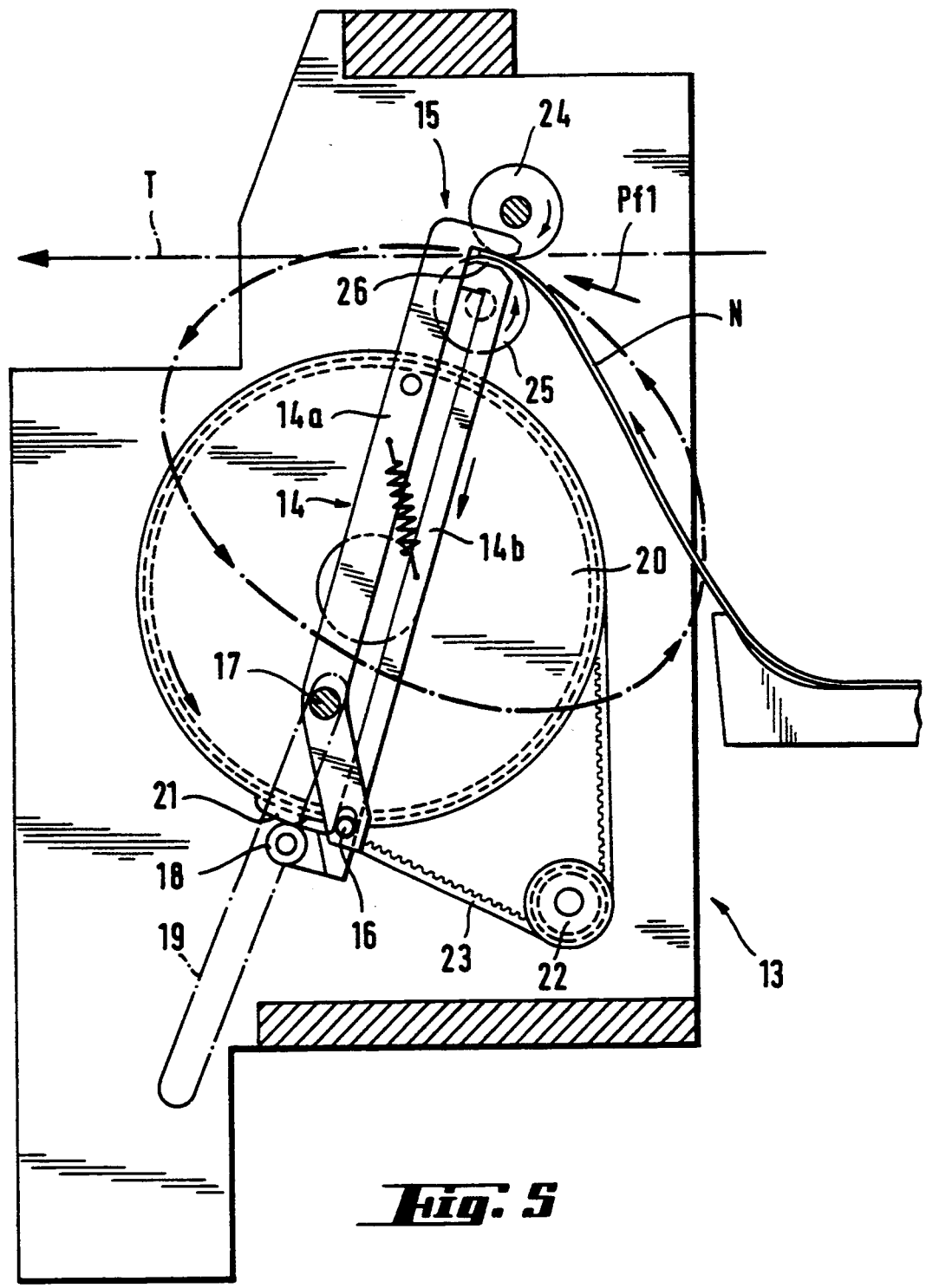
FIG. 5 shows a film feeder device in a transfer position.

FIG. 3 shows the inlet side 3 of the photographic copy apparatus 1. It is seen very clearly that the rotating axle of the disk 9 on the inlet side and the arbors 51 and 61 for the supply spools 5 and 6 are located in an approximately straight line extension of the film transport path. The film reversing rollers 11 located above and below the winding arbors 51 and 61 on the disk on the inlet side, are also seen clearly. They are intended to guide the second negative film strip N, held in reserve from the rear supply spool 6, in the waiting position past the supply spool 5 in the working position. Preferably, the photographic copy apparatus 1 is equipped, as shown in FIG. 3 and in detail in FIGS. 4–6, with an automatic film feeder device 13 for the transfer of the front end of the film to a film drawing-in pair of rollers 24 and 25, located at the inlet of the film transport path T. In an especially convenient configuration, the film feeder device 13 comprises a pivoting arm 14 and a film clamp 15 provided at the front end of the pivoting arm. The front end of the film may be clamped into a film clamp gap 26 of the film clamp 15. The pivoting arm may be moved from a rest position (FIG. 4) into a transfer position (FIG. 5) wherein the negative film strip N is passed to the pair of film drawing-in rollers 24 and 25 and transferred to it. In a preferred variant embodiment the pivoting arm, as shown in FIGS. 4 and 5, is articulated eccentrically onto a crank disk 20. The crank disk 20 is preferably motor driven. For example, as seen, a drive pinion 22 and a tooth belt running over it, are provided for this purpose. A guide pin 17 is located on the end of the pivoting arm 14 facing the film clamp, said pin sliding in a slot guide 19. Guided in this manner, the rotating arm 14 describes, during the rotation of the crank disk 20, an approximately elliptical shaped path, the highest point whereof is located approximately in the area of the film drawing-in pair of rollers 24 and 25.

In a particularly preferred variant embodiment the film clamp 15 is realized by a special design of the pivoting arm 14 itself. In particular, the pivoting arm 14 is in two parts. The partial arm 14a articulated onto the crank disk is bent at its front end in the shape of a beak. The second partial arm 14b is connected in the connecting point 16 with the first partial arm and is bent at its front end to resemble a hook. The hook shaped front end of the second partial arm 14b is pressured for example by a spring against the bottom side of the beak shaped front part of the first partial arm 14a. The second partial arm 14b is displaceable against the effect of this spring force relative to the first partial arm 14a, thereby opening the film clamp gap 26 between the beak shaped front end of the first partial arm 14a and the hook shaped front end of the second partial arm 14b. In the operation of the film feeder device 13, the film clamp gap 26 is automatically opened at the correct moment. For this, a rotating roller 18 is located at the rear end of the second partial arm 14b, and is capable of engaging a cam 21 on the crank disk 20. In a certain section of the rotation of the crank disk 20, the roller 18 passes over the cam 21. The second partial arm 14b is thereby moved back relative to the first partial arm 14a and the film clamp gap 26 is opened. In the example shown, the film clamp gap 26 is preferably opened when the pivoting arm 14 attains, along its moving path, approximately the highest point and the film clamp gap is being guided about at the height of the film transport path T, as seen in FIG. 5.

Figure 6:
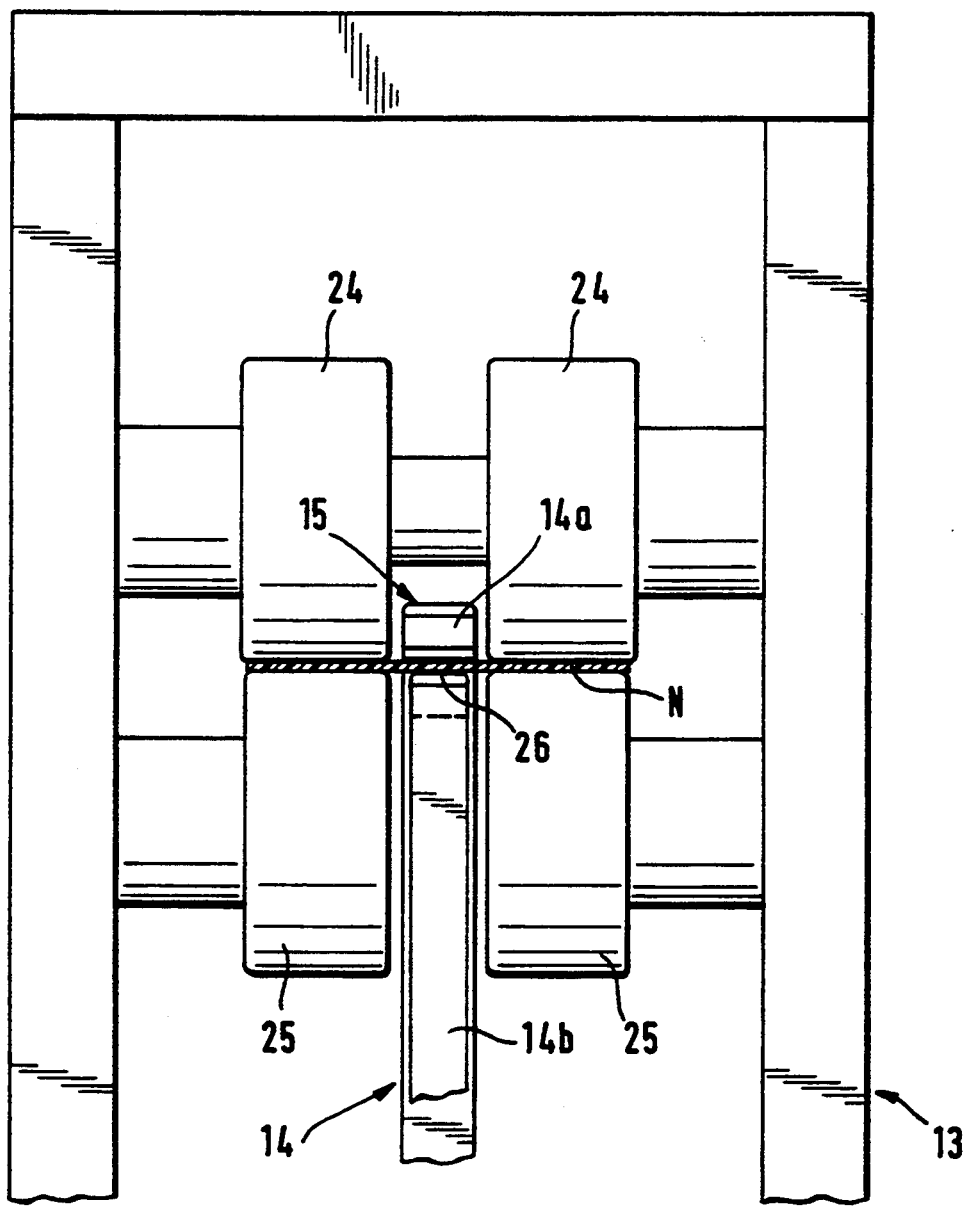
FIG. 6 shows a front elevation of a film feeder device in the transfer position according to the arrow Pf 1 in FIG. 5.

It is particularly advantageous to divide the lower counter pressure roller 25 of the film drawing-in roller pair 24 and 25. The upper driven friction roller 24 advantageously has a rubber bead, located opposite the counter pressure roller halves on the upper roller 24. In this manner, the pivoting arm 14 may be moved simply between the halves of the counter pressure roller 25, whereby the front end of the film may be clamped in the film drawing-in roller pair 24 and 25 and the film clamp 15 released automatically. This variant is shown in FIG. 6, which represents a front elevation of the film feeder device 13 according to the arrow Pf1 in FIG. 5.

It is understood that the rotation of the disk 9 on the inlet side and that of the pivoting arm 14 carrying the film clamp 15 are coordinated with each other. It is especially advantageous to couple together the motion sequences in a manner such that the film front end may be transferred to the pair of film drawing-in rollers 24 and 25 without the formation of loops.

In a preferred variant embodiment of the photographic copy apparatus 1 (FIG. 3) on the inlet side 3, means 41 are provided to monitor the fill degree of the supply spool 5 in the working position. These means 41 may, for example, be in the form of a conventional photodetector and are connected with the control devices, not shown, for the drive means, again not shown, of the disk 6 and the film feeder device 13. In this way, the entire process of changing the film spools is readily automatized.

Figure 7:
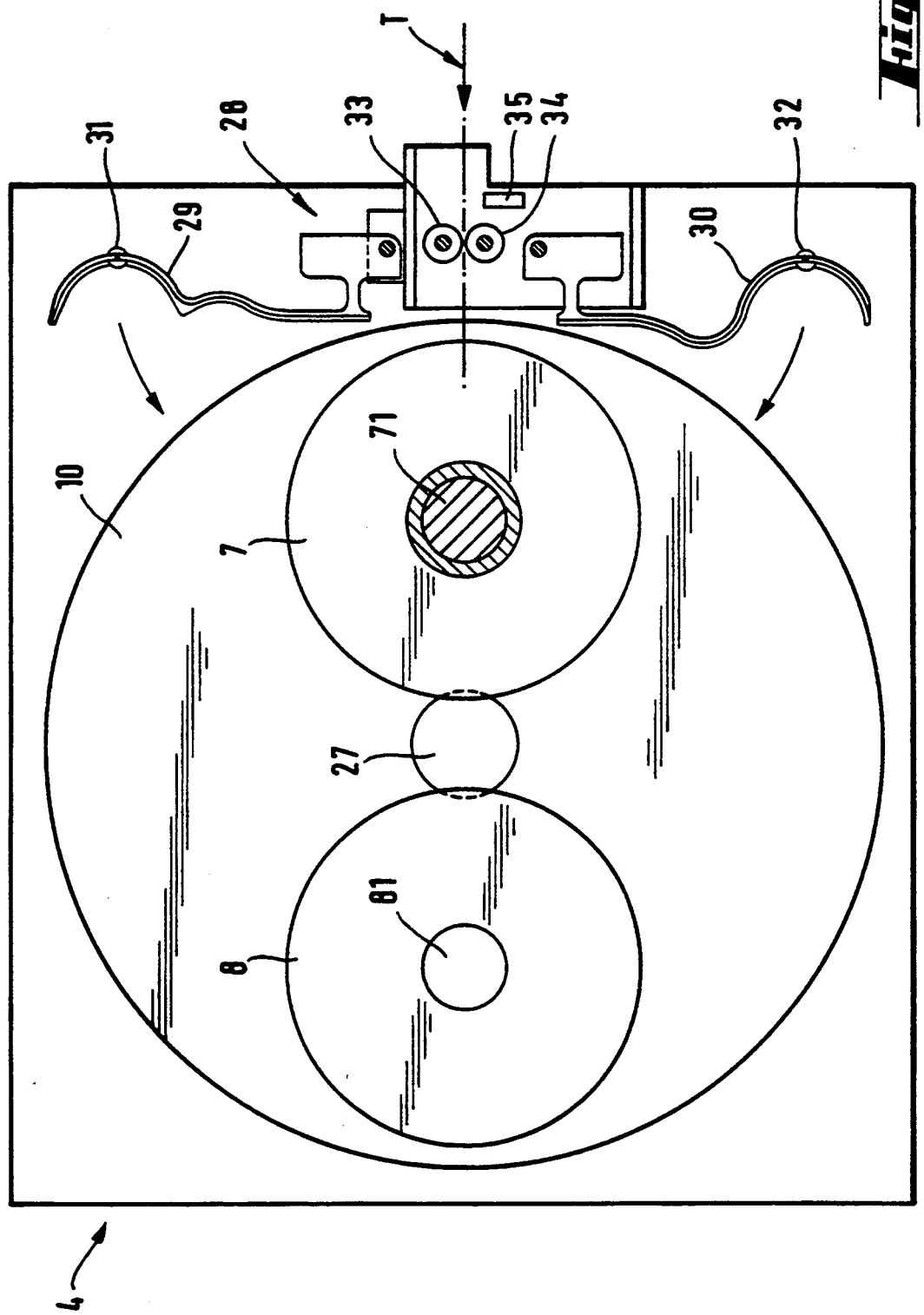
FIG. 7 shows a detailed view of the outlet side of the photographic copy apparatus with the winding spools and a winding device in the open state.
Figure 8:
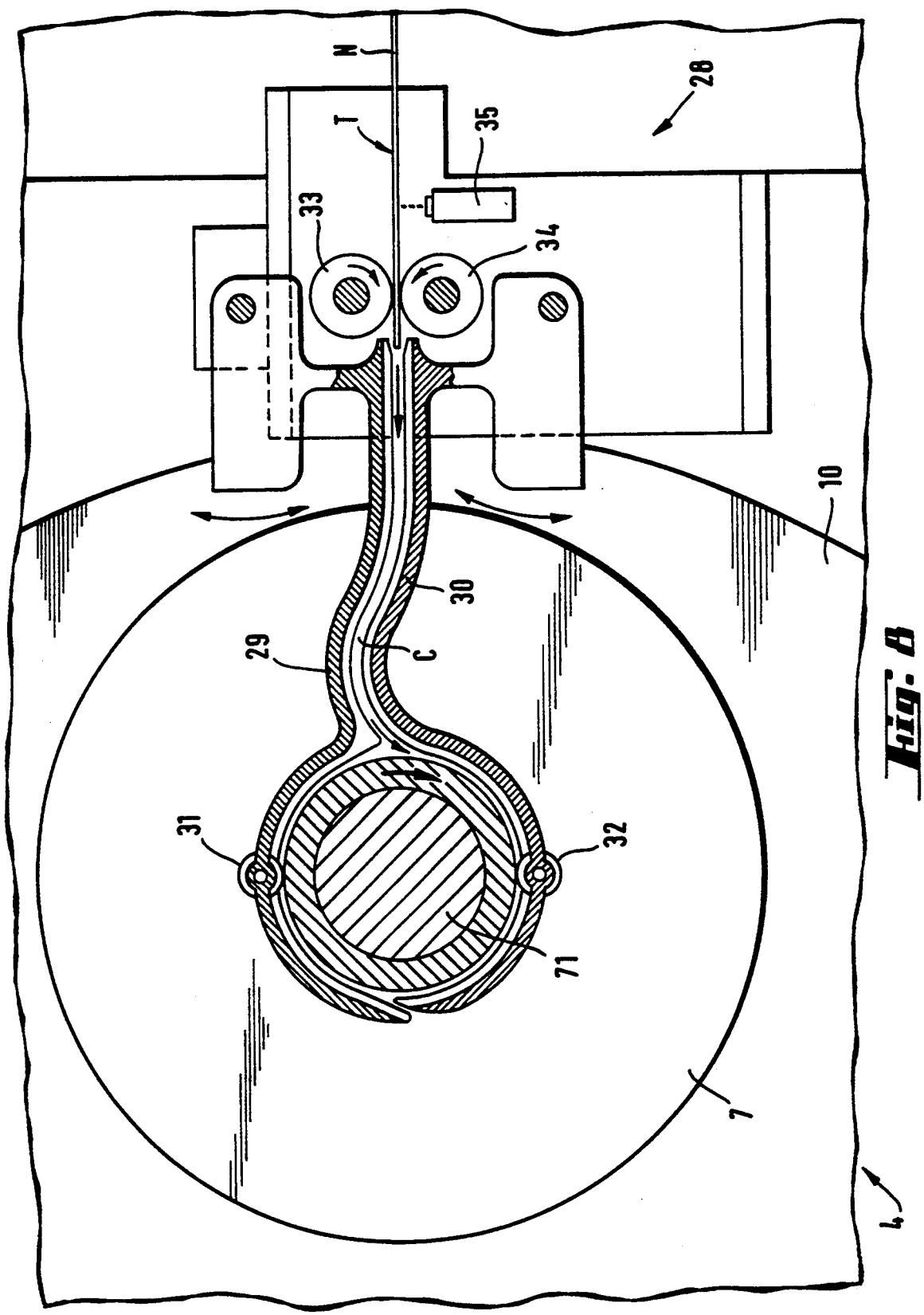
FIG. 8 shows a view of the outlet side of the photographic copy apparatus according to FIG. 7 with a pivoted threading device in a closed state.
Figure 9:
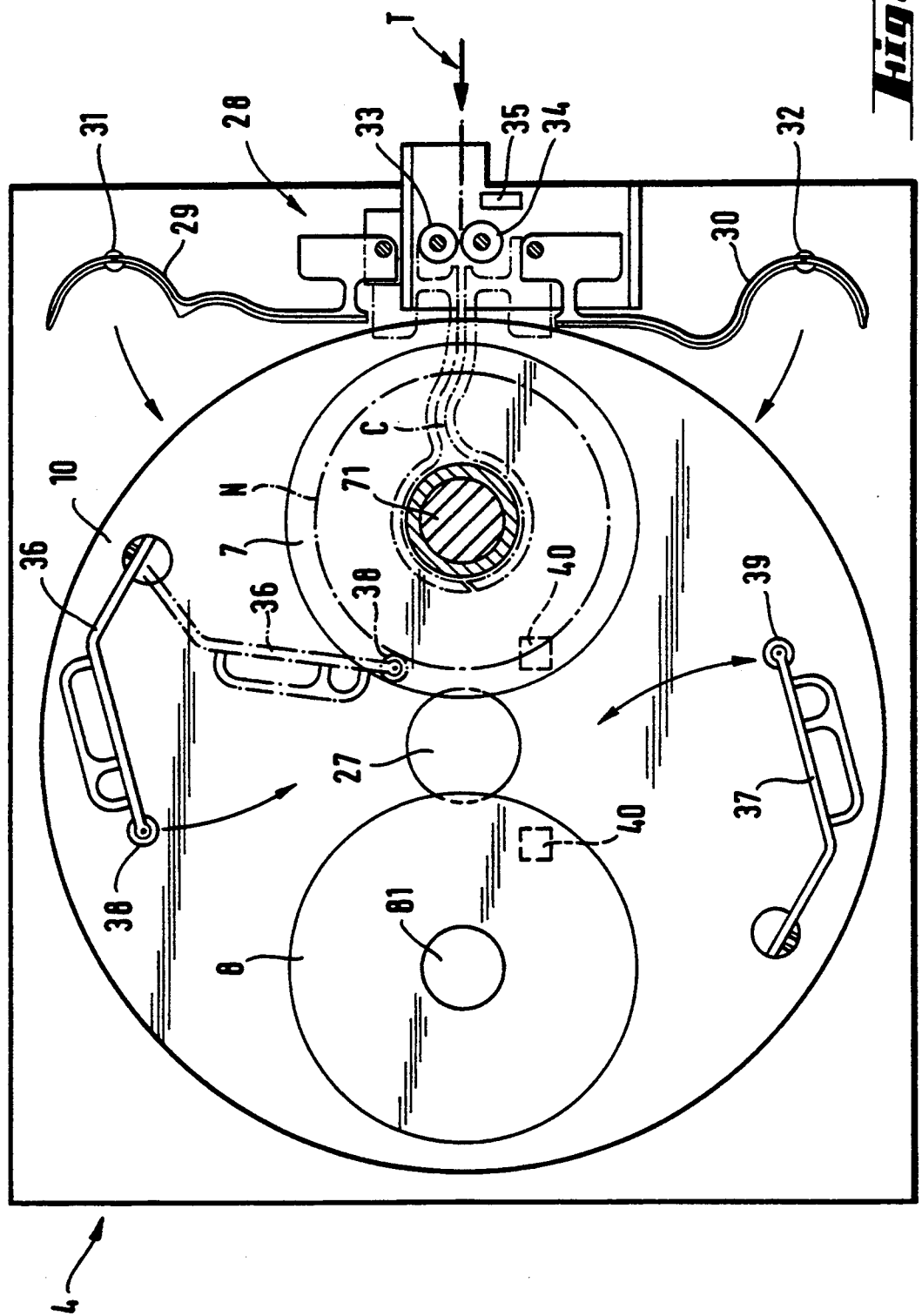
FIG. 9 shows a view of another exemplary embodiment of the outlet side of a photographic copy apparatus according to FIG. 7 with film holding devices.

In FIGS. 7-9 the outlet side of the photographic copy apparatus 1 is shown. As on the inlet side, it is clearly seen here again that the rotating axle 27 of the disk 10 and the winding arbors 71 and 81 for the winding spools 7 and 8 placed at approximately equal distances on either side of the rotating axle, are located in an approximately straight line extension of the film transport path T. Outside the copy apparatus 1, a film threading device 28 is provided, whereby the film front end may be guided from the film transport path T to the winding core of the winding spool 7 in the working position. FIG. 7 shows the film threading device 28 in the open state, in which it is usually maintained during the copying of the negative film strip N. FIG. 8 shows the film threading device 28 during the threading process in the closed state.

The film threading device 28 preferably has two spoon like pivoting arms 29 and 30 articulated onto the copy apparatus 1 above and below the film transport path T in the immediate vicinity of the film discharge roller pairs 33 and 34. The pivoting arms 29 and 30 preferably are automatically pivoted by unspecified means. In the in-pivoted state, the spoon like pivoting arms 29 and 30 encompass the winding core of the winding spool 7 in the working position and form a film guide channel C which extends directly from the film discharge roller pair 33 and 34 at the end of the film transport path T to the winding core. The spoon like pivoting arms 29 and 30 are interchangeable; the winding direction of the negative film strip N, on the winding core of the winding spool 7 may thus be selected in a simple manner in or against the clockwise sense. The pivoting arms 29 and 30 have in their frontal area surrounding the winding core, preferably rubber coated rollers 31 and 32, which facilitate the insertion of the front end of the film. It is understood that the motor driven rotation of the disk 10 on the outlet side and the automatic motion of the film threading device 28 are coordinated with each other. The spoon like pivoting arms 29 and 30 can preferably be pivoted inward only after the rotation of the disk 10 on the outlet side is terminated.

FIG. 9 shows another exemplary embodiment of the outlet side 4 of the photographic copy apparatus 1. In this case a film holding device is provided on the disk 10 for each of the winding spools. The film holding devices preferably are in the form of spring loaded pivoting arms 36 and 37 and may be pivoted against the winding spool 7 or 8. In FIG. 9 the two possible positions of the film holding clamp are shown by the exemplary film holding clamp 36. The clamping position is indicated by broken lines. The front ends of the pivoting arms 36 and 37 are equipped with rollers 38 and 39. These are preferably coated with rubber or the like to prevent damage upon contact to the surface of the negative film strip.

In the transport direction of the negative film strip N, immediately in front of the film discharge roller pair 33 and 34, a detector device 35 is provided for the rear end of the negative film strip N. The detector device 35 is, for example, in the form of a photodetector and is connected with control means, not shown, for the film holding devices 36 and 37 and the drives, again not shown, of the disk 10 on the outlet side and the film threading device 28.

According to the view in FIG. 9, the disk 10 on the outlet is additionally provided with monitoring means 40 for the detection of the presence of a film spool 7 or 8 in the waiting position. The monitoring devices preferably are formed as light barriers. It is prevented, in this manner, that a negative film strip is advanced, while there is no winding spool in the working position.

In operation, the photographic copy apparatus 1 according to the invention differs from the state of the art apparatuses, in particular, in that the working supply spool and the winding spool selected are moved into a working position wherein they are located in an approximately straight line extension of and in the immediate vicinity of the film transport path. The supply spool and the winding spool held in the waiting position, on the other hand, are located in an approximately straight line extension of the film transport path, always behind the film spools in the working position.

In normal operation a full supply spool 5 is in the working position on the inlet side 3 of the copy apparatus. The negative film strip N passes through the idling film drawing-in roller pair 24 and 25, for example initially through a film cleaner (not shown). From here, it is transported to the exposure station 2, where the processing itself is taking place. The reeling off drive (not shown) for the supply spool 5 may move in or against a clockwise direction, so that the negative film strip N may be withdrawn. The orientation of the coated side of the negative film strip N upwards or downwards, may be defined simply by the insertion of the supply spool 5. The winding velocity usually mounts to, independent of the spool diameter, 360 mm/s. During the unwinding of the supply spool 5 in the working position, a second full supply spool 6 is set upon the mar winding arbor 61. The front end of the film is passed over a lower reversing roller 11 and clamped into the film feeder device 13. A friction brake (not shown) acting on the rear winding arbor 61 on the one hand permits the drawing off of the film, but on the other hand, prevents the unintended formation of loops.

As soon as the supply spool in the working position is empty, the detector 41 issues a signal which actuates the change of spools. The film drawing-in roller pair 24 and 25 is driven at a predetermined threading velocity. The drive for the film feeder device 13 is activated, the film clamping gap 26 of the film clamp 15 is moved approximately to the height of the film transport path T and the front end of the film transferred to the film drawing-in roller pair. The film feeder device 13 is moved further, passes along an approximately elliptical shaped motion path, under the film transport path T and is returned into its initial position. The drive is deactivated.

Approximately simultaneously with the movement of the film feeder device 13, the automatic changing process of the supply spools 5 and 6 is initiated. For this, the disk 9 on the inlet side is rotated by 180 in a clockwise direction, preferably by means of a stepping drive (not shown). In the process, the supply spool 5, previously in the working position, is moved into the waiting position, while the second, full supply spool 6 is moved from the waiting position into the working position. A controlling cam is located on the drive shaft of the stepping drive, which prior to the engagement of the stepping drive pivots a driving lever around a pivot point, thereby on the one hand separating a coupling pinion from the drive gear of the winding arbor 51, and on the other, activates a friction brake for the winding arbor 51, together with a mechanical lock (not shown) of the disk 9 on the inlet side. The rotation of the disk 9 is controlled in coordination with the motion of the automatic film feeder device 13 in a manner such that no loose loops are formed during the exchange of spools 5 and 6, whereby the film may be scratched. Following the completion of the rotating step of the disk 9 on the inlet side, the controlling cam pivots the drive lever inward. By the process, first the drive pinion is reconnected, second the friction brake of the winding arbor 61 (which is now in the working position) is released and third the disk 10 is again locked mechanically (not shown). The full supply spool 6, now in the working position is placed into motion by the drive and the normal copying process may be continued.

On the outlet side 4 of the photographic copy apparatus, the negative film strip N leads the film transport path T through the film discharge roller pair 33 and 34 and is wound onto the winding spool 7 in its working position on the winding arbor 71. The film tension required is controlled independently of the spool diameter. The winding arbor 71 may be driven depending on the winding direction required, in or against the clockwise direction. During this operation, a second winding spool is placed onto the second winding arbor 81.

As soon as the detector 35 detects the rear end of the negative film strip N, a signal generated by it, deactivates the drive (not shown) for the winding spool 7 in the working position and the stop of the film end holding device 36 is released. The film end holding device 36 is pivoted by the force of a spring in a damped motion against the now full winding spool 7 in order to clamp the end of the film and prevent the farming apart of the wound film.

To change the position of the winding spools 7 and 8, the disk 10 on the outlet side is rotated clockwise by a stepping drive (not shown). For this purpose, initially a controlling cam (not shown) located on the drive of the step switching gear pivots a drive lever around a pivot point (not shown). The drive pinion (not shown) is thereby separated from the tooth gear of the winding arbor 71, a friction brake located on the disk 10 on the outlet side for the winding arbor 71 activated and the disk 10 mechanically unlocked.

Following the rotation of the disk 10 on the outlet side by 180 the empty winding spool 8, previously in the waiting position is now in the working position, while simultaneously the full winding spool 7 is moved back into the waiting position. The controlling cam pivots the drive lever back. The drive pinion and the tooth gear of the winding arbor 81 are brought into engagement, the friction brake of the winding arbor 81 is released and the disk 10 on the outlet side is locked in its terminal position. The drive then places the new empty winding spool 8 into motion in the winding direction desired. The full winding spool 7, in the waiting position, is drawn off the winding arbor 71 following the preferably manual resetting of the film end holding device 36 and replaced by an empty winding spool. For example, the empty supply spool 5 previously taken off on the inlet side 3 may be used on the outlet side as the new winding spool.

In the area of the film discharge roller pair 33 and 34, the film threading device 28 is located. The spoon like pivoting arms 29 and 30 are pivoted to empty winding spool 8 in the working position, so that its frontal areas surround the winding core of the spool. In this manner, a channel for the negative film strip N is formed; it extends from the film discharge roller pair 33 and 34 to the winding core of the winding spool 8. By interchanging the spoon like pivoting arms 29 and 30 located above and under the film transport path T on the copy apparatus 1, the winding direction may be selected clockwise or counterclockwise. The winding spool 8, in the working position is driven initially at a slightly higher winding velocity than the feed velocity of the negative film strip N. As soon as the film has been wound about 1½ to about three turns onto the winding core of the winding spool, a frictional connection of the film with the winding core is established by self-locking. This temporarily accelerates the discharge roller pair 33 and 34. When this is detected, the spoon like pivoting arms 29 and 30 are returned into their initial position and the winding velocity of the winding roller 8 is adapted to the feed velocity of the negative film strip N. This completes the change of spools on the outlet side and the normal operation of the photographic copy apparatus may be resumed.

The photographic copy apparatus according to the present invention, facilitates the task of the operating personnel and provides sufficient time to change spools. In particular, the activities required for replacing the spools are restricted merely to exchanging an empty supply spool with a new full one and to replace a full winding spool with an empty one. It is even possible to insert an empty supply spool removed on the inlet side onto the outlet side. The operating personnel is no longer required to monitor the fill degree of the film spools and there is no need to ascertain which of the film spools on the inlet or the outlet side are due for replacement. The photographic copy apparatus according to the invention makes an almost uninterrupted operation possible, as, for example, there is no need to wait until the preceding negative film strip has entirely left the film transport path before a new negative film strip may be threaded in at the inlet side. In particular, it is this condition that permits it to increase production and copying capacity.

It will be appreciated by those of ordinary skill in the art that the present invention can be embodied in other specific forms without departing from the spirit or essential character thereof. The presently disclosed embodiments are therefore considered, in all respects, to be illustrative and not restrictive. The scope of the invention is indicated by the appended claims rather than the foregoing description and all changes which come within the meaning and range of equivalents thereof are intended to be embraced therein.

What is claimed is:

1. Photographic copying apparatus for the processing of lengths of copy masters adhesively bonded into long film strips comprising:
   an exposure station, located along a film transport path of a film strip, wherein the film strip is exposed onto an unexposed photographic copy material passed along a paper path extending within the copy apparatus;
   two supply spools located on an inlet side of the photographic copy apparatus from which the film strip is selectively wound off;

two winding spools located on an outlet side of the copy apparatus onto which the film strip is selectively wound after passage through the copy apparatus, one supply spool and one winding spool being in working positions connected with the film strip being processed, while other supply and winding spools are located in waiting positions, spools connected with the film strip being located in an approximate straight line extension of, and directly adjacent to, the film transport path, and film spools in waiting positions being located in an approximate straight line extension of the film transport path behind the film spools located in working positions;

an automatic film feeder device for transferring a front end of a film strip from the supply spool in the waiting position to a film drawing-in roller pair provided at an inlet of the film transport path; and a pivoting arm and a film clamp into which the front end of the film strip from the supply spool in the waiting position is clamped and which is located on a front end of the pivoting arm, said film clamp moving from a rest position into a transfer position wherein the film strip is transferred to the film drawing-in roller pair, said pivoting arm being articulated eccentrically onto a motor driven crank disk located under the film drawing-in roller pair, an end of the pivoting arm opposite the film clamp being guided in a slot guide.

2. Apparatus according to claim 1, wherein the two supply spools on the inlet side and the two winding spools on the outer side of the photographic copy apparatus are located so that a film spool in a working position is moved automatically into a waiting position when the supply spool is empty or the winding spool full, while simultaneously a full supply spool and an empty second winding spool in waiting positions are moved into working positions.

3. Apparatus according to claim 2, wherein each of the two supply spools and the two winding spools are mounted on motor driven disks provided at the inlet and the outlet sides of the photographic copy apparatus, with rotating axles of said disks being approximately perpendicular to the film transport path.

4. Apparatus according to claim 3, wherein the disks are located approximately vertically on the inlet and the outlet sides of the copy apparatus such that the rotating axles of the disks and film spool winding arbors mounted on the disks at equal distances on either side of the rotating axles are arranged in an approximately straight line extension of, and within a plane defined by, the film transport path.

5. Apparatus according to claim 4, wherein the disks carrying the film spools are rotated by at least 180 degrees around their rotating axles so that supply and winding spools in waiting positions can be moved into working positions and vice versa.

6. Apparatus according to claim 5, wherein the disks are driven by a stepping motor.

7. Apparatus according to claim 1, wherein a lower counter pressure roller of the film drawing-in roller pair is divided such that the pivoting arm with the film clamp is passed between the divided rollers, a clamping gap of the film clamp being guided approximately at a height of the film transport path and the film clamp being released automatically upon passing the film drawing-in roller pair to clamp the front end of the film strip into the film drawing-in roller pair.

8. Apparatus according to claim 1, wherein rotation of the disk carrying the film supply spools on the inlet side and motion of the pivoting arm equipped with the film clamp for the front end of the film are coupled, so that the film strip front end is transferred to the film drawing-in roller pair without formation of loops.

9. Apparatus according to claim 1, further comprising:
means for monitoring a fill degree of a supply spool in the working position, said monitoring means being connected with control devices for driving the disk carrying the supply spools and the film feeder device.

10. Apparatus according to claim 1, further comprising:
an automatically operated film threading device on the outlet side of the copy apparatus through which the front end of the film strip is passed from a film transport path to a winding core of a winding spool in the working position.

11. Apparatus according to claim 10, wherein the film threading device further comprises:
two spoon like pivoting arms articulated above and under the film transport path and in an immediate vicinity of a film discharge roller pair onto the outlet side of the copy apparatus, said pivoting arms in an in-pivoted state surrounding the winding core of a winding spool in a working position thereby forming a guide channel for the front end of the film, extending from the film discharge pair of rollers to the winding core of the winding spool in the working position.

12. Apparatus according to claim 11, wherein automatic motion of the spoon like pivoting arms and automatic rotation of a disk carrying the winding spools are coordinated so that the pivoting arms are pivoted-in only after termination of rotation of the disk.

13. Apparatus according to claim 11, wherein the spoon like pivoting arms are mutually interchangeable in their location on the copy apparatus such that a winding direction of the film strip on the winding core of the winding spool can be either in or against a clockwise direction.

14. Apparatus according to claim 10, wherein for each of the winding spools, a film end holding device is provided, said holding device being located on a disk on the outlet side and including spring loaded pivoting arms pivoting against a winding spool.

15. Apparatus according to claim 10, wherein a disk on the outlet side is provided with light barrier monitoring devices to ascertain presence of winding spools on the disk.

16. Apparatus according to claim 14, wherein at the outlet of the film transport path, a detector device is provided for detecting the film strip end, which on one hand is connected with a control device for the film end holding devices and on another hand, with control devices for drives of the disk on the outlet side and the film threading device.

17. Apparatus according to claim 1, wherein empty supply spools are used as winding spools.

18. Photographic copying apparatus for the processing of lengths of copy masters adhesively bonded into long film strips comprising:
an exposure station, located along a film transport path of a film strip, wherein the film strip is exposed onto an unexposed photographic copy material passed along a paper path extending within the copy apparatus;

two supply spools located on an inlet side of the photographic copy apparatus from which the film strip is selectively wound off;

two winding spools located on an outlet side of the copy apparatus onto which the film strip is selectively wound after passage through the copy apparatus, one supply spool and one winding spool being in working positions connected with the film strip being processed, while other supply and winding spools are located in waiting positions, spools connected with the film strip being located in an approximate straight line extension of, and directly adjacent to, the film transport path, and film spools in waiting positions being located in an approximate straight line extension of the film transport path behind the film spools located in working positions; and an automatically operated film threading device on the outlet side of the copy apparatus through which a front end of the film strip is passed from the film transport path to a winding core of a winding spool in the working position, said threading device further including two spoon like pivoting arms articulated above and under the film transport path and in an immediate vicinity of a film discharge roller pair onto the outlet side of the copy apparatus, said pivoting arms in an in-pivoted state surrounding the winding core of a winding spool in a working position thereby forming a guide channel for the front end of the film strip, extending from the film discharge pair of rollers to the winding core of the winding spool in the working position.

19. Apparatus according to claim 18, further comprising:

a motor driven disk on which the two winding spools are mounted, wherein automatic motion of the spoon like pivoting arms and automatic rotation of the disk carrying the winding spools are coordinated so that the pivoting arms are pivoted-in only after termination of rotation of the disk.

20. Apparatus according to claim 19, wherein the spoon like pivoting arms are mutually interchangeable in their location on the copy apparatus such that a winding,direction of the film strip on the winding core of the winding spool can be either in or against a clockwise direction.

21. Apparatus according to claim 20, wherein for each of the winding spools, a film end holding device is provided, said holding device being located on the disk on the outlet side and including spring loaded pivoting arms pivoting against a winding spool.

* * * * *